United States Patent [19]

Coleman, Jr. et al.

[11] 3,763,317

[45] Oct. 2, 1973

[54] SYSTEM FOR CORRECTING TIME-BASE ERRORS IN A REPETITIVE SIGNAL

[75] Inventors: Charles H. Coleman, Jr., Belmont; Robert P. MacKenzie, Menlo Park, both of Calif.

[73] Assignee: Ampex Corporation, Redwood City, Calif.

[22] Filed: Apr. 1, 1970

[21] Appl. No.: 24,666

[52] U.S. Cl. .......................................... 178/69.5 TV

[51] Int. Cl. ................................................ H04l 7/00

[58] Field of Search ............... 178/69.5 DC, 69.5 R, 178/69.5 F, 69.5 TV, 6.6 TC, 5.4 CD; 179/15 BS, 15 AT, 100.2 K; 328/155; 333/18, 29

[56] References Cited

UNITED STATES PATENTS

| | | | |
|---|---|---|---|
| 3,141,926 | 7/1964 | Newell | 178/6.6 A |
| 3,238,300 | 3/1966 | Bopp et al. | 178/69.5 TV |
| 3,384,707 | 5/1968 | Bopp et al. | 178/69.5 DC |
| 3,419,681 | 12/1968 | Bopp et al. | 178/69.5 DC |
| 3,454,719 | 7/1969 | Horstmann et al. | 178/69.5 TV |
| 3,505,473 | 4/1970 | Dillenberger et al. | 178/69.5 TV |
| 3,534,170 | 10/1970 | Davies | 178/69.5 TV |

*Primary Examiner*—Robert L. Griffin
*Assistant Examiner*—John C. Martin
*Attorney*—Robert G. Clay

[57] ABSTRACT

A system for correcting the phase of a substantially repetitive signal with respect to a known reference timing signal by providing a controlled variable delay of the former, in which a plurality of delay lines having binary ordered delay periods are interconnected by switching means, operating on command, to selectively cascade certain combinations of the delay lines and thereby provide a desired composite delay for each successive cycle of the repetitive signal. The system is particularly suited for providing extended delay range capability for synchronizing the phase of a television signal with a local reference signal. For this purpose, the total composite delay is selected to equal a basic period of repetition of the signal and the switching means interconnecting the delay lines is conditioned to operate during a synchronizing pulse waveform carried by the video signal, thereby avoiding the introduction of undesirable switching transients into those portions of the signal carrying analog picture information. In combination with the switched, binary ordered delay lines, circuitry is shown for developing a digital word signal representing the phase error for each cycle of the repetitive signal.

19 Claims, 11 Drawing Figures

INVENTORS
CHARLES H. COLEMAN, JR.
BY ROBERT P. MACKENZIE

Larry A. Jackson
ATTORNEY

INVENTORS
CHARLES H. COLEMAN, JR.
ROBERT P. MACKENZIE

BY Larry A. Jackson
ATTORNEY

INVENTORS
CHARLES H. COLEMAN, JR.
ROBERT P. MACKENZIE
BY
[signature]
ATTORNEY

INVENTORS
CHARLES H. COLEMAN, JR.
BY ROBERT P. MACKENZIE

Larry Jackson
ATTORNEY

INVENTORS
CHARLES H. COLEMAN, JR.
ROBERT P. MACKENZIE
BY Larry A. Jackson
ATTORNEY INVENTORS
CHARLES H. COLEMAN, JR.
ROBERT P. MACKENZIE
BY
Larry A. Jackson
ATTORNEY INVENTORS
CHARLES H. COLEMAN, JR.
ROBERT P. MACKENZIE
BY
Larry A. Jackson
ATTORNEY

SYSTEM FOR CORRECTING TIME-BASE ERRORS IN A REPETITIVE SIGNAL

The present invention generally relates to systems for effecting a variable delay of an electrical signal and more particularly to systems in which the effecive delay is varied, at least in part, by selectively cascading a multiplicity of fixed delays with the use of electrically controlled switching means.

While systems in accordance with the present invention may be useful in providing a variable signal delay for a variety of applications, the preferred form of the invention as described herein is employed for correcting time-base errors of repetitive signals. Video and radar signals are examples of such repetitive signals, wherein each carries analog signal information and synchronizing waveforms which repeat at known periodic intervals. When the synchronizing waveforms of repetitive signals exhibit a phase or frequency deviation with respect to a desired timing rate, usually represented by a reference signal or another repetitive signal of the same type, this timing difference may be reerred to as a time-base error. The present invention provides for synchronizing a repetitive signal, such as a television signal, with a referenced timing signal by reducing the time-base error therebetween. Initial and thereafter continued reduction of the time-base error is achieved by providing controlled and variable delay of the television signal. The amount of time delay so provided is determined by the instantaneous magnitude of the time-base error, which error is sampled at the times of the synchronizing pulses. The synchronizing pulses thus serve as bench marks relative to which timing errors, if any, are determined.

Video signals are comprised of repetitive synchronizing waveforms of several different timing periods. The lowest frequency or longest period synchronizing waveforms occur at video frame rate, where a single video frame carries a complete video picture consisting of two interlaced fields, each field being formed of a large number of video lines. Higher frequency synchronizing waveforms thus occur at field rate and at line rate. In order to provide for stability of the resulting television picture, the synchronizing waveforms must occur at a generally constant rate. If the average frequency of the synchronizing waveforms deviates beyond predetermined limits or there is an abrupt change in the time separation between adjacent waveforms, distortion of the television picture follows. Moreover, in systems where it is desired to alternately apply two or more video signals to a television receiver, the corresponding synchronizing waveforms of each signal must exhibit a close inter-signal phase and frequency synchronization in order to avoid picture roll or other picture distortion upon switching from one video signal to another.

Several systems have been devised for correcting timing errors in video signals. In each previously known system, a controlled and variable delay of the video signal is provided for reducing the time-base error with respect to a reference signal or another video signal. For example, U.S. Pat. No. 3,017,462 illustrates an arrangement for servoing a videotape recorder during playback in order to bring the video playback signal into synchronization with a reference signal. In such case, the recording mechanism itself serves as the variable signal delay. To achieve finer time-base error corrections, those incapable of removal by an electromechanical servomechanism, voltage variable electronic delay lines have been employed such as disclosed in U.S. Pat. Nos. 3,202,769 and No. 3,100,816. While these known systems perform well for the intended purpose, they each have limitations which preclude their use for correcting all types and magnitudes of time-base errors, such as those encountered when attempting to synchronize television signals from diverse sources. For example, voltage controlled variable delay lines are capable of effecting extremely fine time-base error corrections such as required for color television signals but are limited as a practical matter to small total delay ranges, on the order of several microseconds. Consequently, for a continuously variable delay line system to fully synchronize two television signals, the signals must initially be brought within a few microseconds of phase separation, which in many cases is impossible or impractical to achieve with existing systems.

In addition to the continuously variable delay systems mentioned above, arrangements have been employed in which a plurality of series or parallel connected fixed delay lines are selectively switched in and out to provide an incrementally variable delay of the television signal. While such systems may provide some increase in delay range capability, nevertheless the large number of delay sections required for useful delay ranges detracts from the practicality thereof. Furthermore, the switching schemes heretofore employed for interconnecting the various delay units have been found either too expensive or too unreliable.

Accordingly, it is an object of the present invention to provide a method and apparatus for use in a time-base error correcting system having a heretofore unavailable large delay range capacity such that two television signals (or one television signal and a reference signal) having substantial phase separation can be rapidly brought to and held in synchronization.

Another object of the present invention is to provide a time-base error correcting system which can achieve and maintain timing synchronization between two or more television signals of slightly different frequency without noticeable disruption of a television picture resulting from these signals.

A still further object of the present invention is to provide a time-base error correcting system capable of a more rapid initial synchronization of the video signals and similarly, being capable of rapidly reacquiring synchronization in the event of an abrupt relative phase shift between the signals.

Another object of the present invention is to provide a time-base error correcting system having a variable and sufficiently large delay capacity to allow for altering the relative phase of a remotely originating video signal to the extent necessary for synchronizing the remote video signal with a locally generated signal.

A still further object of the present invention is to provide a method and apparatus for accurately and reliably measuring the phase separation between an uncorrected video signal and a reference signal and for developing a signal therefrom representing the amount of time-base delay correction required.

Another object of the present invention is to provide such a method and apparatus for measuring the phase separation in which the signal developed thereby is particularly adapted for controlling the variable delay apparatus of the present invention.

A further object of the present invention is to provide accurately timed video information immediately upon switching to a revised time delay so long as the change in delay does not exceed a limited timing interval determined by the design of the system. The absolute capacity of the delay, however, will be substantially greater than such change in delay limit. Additionally, delay changes greater than this limit can be effected although in such instance portions of the video information may be mistimed.

These and other objects are achieved, in accordance with the present invention, by an incrementally variable delay system, wherein a plurality of fixed delay lines having binary ordered delay intervals are interconnected by switching means and selectively cascaded into various combinations to achieve desired composite delay intervals. Comparator means are provided for measuring the phase difference between a repetitive signal to be delayed and a reference signal, in which the measured phase difference is represented by a signal having a binary format adapted for direct connection to and operation of the switching means interconnecting the binary ordered delay lines.

By a preferred arrangement of the switching means, delay lines and phase comparator as described herein, a time-base error correction system is provided for accommodating all possible phase relationships between the repetitive information signal and a reference signal. Moreover, this preferred form of the invention has as a feature of advantage the capability of maintaining synchronization between a reference signal and a repetitive information signal of slightly different frequency. As an example, this allows for maintaining synchronization of a video signal in which the video line frequency or rate is slightly different than the desired line rate determined by a reference timing signal. In such case, the delay system in accordance with the invention provides for either skipping or repeating a full line of video information in order to accommodate the frequency variance between the video and reference signals and in this manner maintain a consistent time spacing between the horizontal synchronizing waveforms preceding each video line. As will be appreciated from the description herein, this feature of the invention may also be extended to achieve full synchronization of a television signal at field and even frame rates. Thus the time-base error correcting system in accordance with the present invention would provide for skipping or repeating a field or a full frame of a video information as required with little or no subjective loss of picture quality.

The practical benefits afforded by a system of the foregoing capabilities will be readily appreciated by those familiar with the television broadcasting industry. For example, and as briefly mentioned above, the present invention allows a local station having a signal "on-the-air," which is synchronized to a local reference generator, to bring into synchronization therewith a remotely originating video signal. By the present invention, signals produced by helical scan video tape recorders may be time-base corrected to a sufficient extent to satisfy broadcast quality standards.

Thus, the present invention generally provides for synchronizing video signals, which may originate from a variety of sources such as from videotape recorders, studio cameras, remote cameras, remote stations, etc. These various signals, once synchronized, may be alternately transmitted without disrupting picture synchronization at the television receiver or such signals may be combined to produce lap-dissolves, split-screen, or other special effects without loss of picture stability.

These and other objects, features and advantages of the invention will become apparent from the following description and accompanying drawings describing and illustrating the preferred embodiments thereof, wherein.

Figure 1:
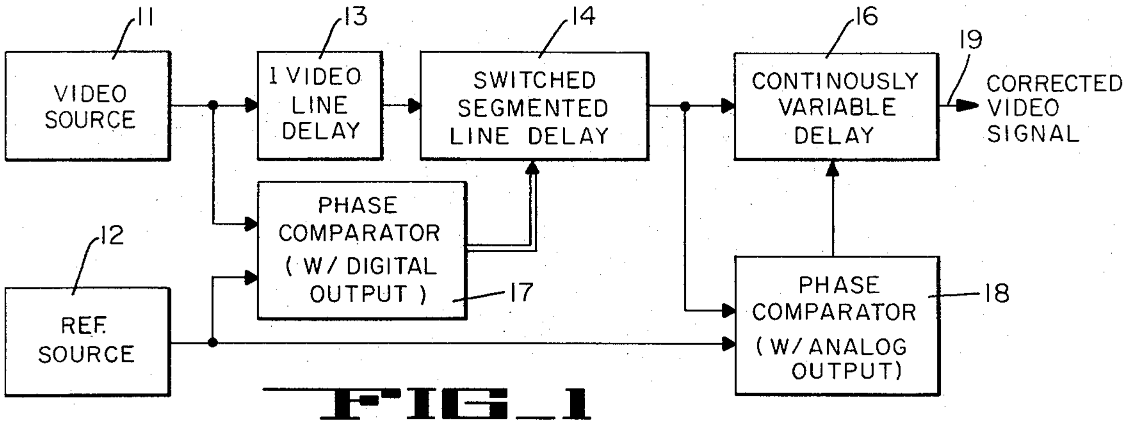
FIG. 1 is a generalized block diagram illustrating the method and apparatus of the present invention employed for correcting time-base errors exhibited by a video signal.

With reference to FIG. 1, a time-base error correcting system utilizing the method and the apparatus of the present invention, is shown wherein the system provides for time synchronizing a video signal issued by source 11 with respect to a reference signal available from source 12. Synchronization is achieved by means of a series of cascaded delay networks, in this instance consisting of a one video line delay 13, a switched segmented line delay 14, and a continuously variable delay 16. Delays 14 and 16 are respectively responsive to a digital phase comparator 17 and an analog phase comparator 18 to provide a relative delay of the video signal with respect to the reference signal such that a time-base corrected or phase synchronized video signal is issued at output 19 of delay 16. While source 12 is described as a reference timing source, such as provided by a crystal controlled signal generator, it will be appreciated that source 12 may take the form of another video signal source to which the signal from source 11 is to be phase matched.

Figure 2:
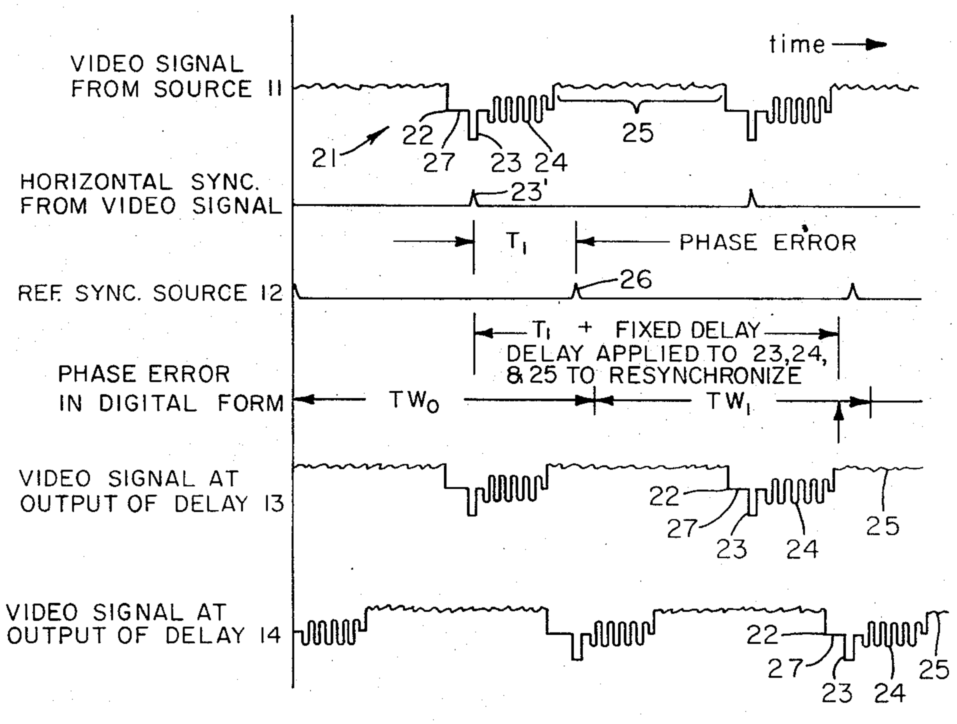
FIG. 2 is a graph depicting portions of the video and reference waveforms occurring in the time-base error correcting system of FIG. 1.

With reference to FIG. 2, the principal waveforms occurring during operation of the system of FIG. 1 are shown, wherein a video signal 21 issued by source 11 includes a horizontal blanking pulse 22 carrying a horizontal sync pulse 23 and color burst 24 which precede a line of analog picture information 25. It is the object of the system shown by FIG. 1 and of the invention to reposition in time each segment of signal 21 occurring between adjacent horizontal sync pulses, such as the signal segment consisting of pulse 23, color burst 24 and analog information 25, whereby the horizontal sync pulses are coincident with corresponding pulses 26 developed by reference source 12. This is achieved by means of variably delaying signal 21, so that each line of signal information carried thereby is synchronized with one of the line reference pulses from source 12.

In order to determine the required delay for repositioning each line of signal 21, the horizontal sync pulses thereof are stripped away to develop a train of isolated horizontal sync pulses such as shown by pulse 23'. The time separation $T_1$, between sync pulse 23' and the succeeding reference sync pulse 26, is measured by means of phase comparator 17 whereupon a digital word $TW_1$ is developed representing the required amount of delay to be provided by delay 14 for positioning video sync pulse 23 in time coincidence with one of the reference sync pulses 26. To facilitate the sequence of operations whereby the phase error is first measured, and in response thereto a desired amount of delay is provided, video signal 21 is fed through a fixed delay 13 corresponding in time lapse to one full video line, wherein this delay occurs between the measurement time of $T_1$ and the setting of switched delay 14 to $TW_1$. Accordingly, video signal 21 appears at the output of delay 13 with horizontal sync pulse 23 and the waveforms associated therewith lagging the original time position by one video line as shown. Video signal 21 is further retarded by delay 14 by an amount equal to $TW_1$ thus positioning sync pulse 23 approximately in time coincidence with the reference sync pulse next following pulse 26. In other words, delays 13 and 14 and phase comparator 17 function to dispose each line of video information with the horizontal synchronizing pulse thereof approximately coincident with the reference pulse immediately following the reference pulse against which the phase of the horizontal video sync pulse was initially measured.

Following the output of delay 14, further and finer time-base error corrections are performed by delay 16 which may include an electronic voltage variable delay line, operating in response to phase comparator 18. Comparator 18 provides an analog error signal in response to a phase measurement made between the signal from source 12 and the video signal available at the output of delay 14.

In order to switch segmented line delay 14 in response to the output of comparator 17 without disruption of signal 21, the shortest incremental delay change capable of being provided by delay 14 is selected to lie within the timewidth of front porch 27 of the horizontal blanking signal 22. In addition, delay 14 and comparator 17 are designed so that the segmented line delay is changed only at discreet times occurring at fixed intervals from the sync pulses of reference source 12. In FIG. 2, the discrete time at which delay 14 is switched is shown to occur at the end of a fixed interval following reference sync pulse 26, which is selected to occur just prior to the succeeding reference sync pulse and thus substantially at or near the middle of front porch 27 of horizontal blanking pulse 22, assuming no change in $T_1$ from the preceding lead phase error, $T_0$.

Each video line is thus repositioned such that the horizontal sync pulses are synchronized to the reference standard. Other video signals having their line rates synchronized to the same reference are thus necessarily synchronized line-by-line to video signal 21. Furthermore, in accordance with the presently described embodiment, the total delay capacity of delay 14 is selected to be equal to or greater than the nominal time length of a video line. This allows video signal 21 to be repositioned in time by a full line, thus accommodating any incoming video signal lying within a line's range of the reference pulse signal. While this embodiment is designed for line-by-line synchronization, it will be shown herein that the invention is easily expanded to provide video signal synchronization at field and frame timing periods.

An important advantage of the present invention is the manner in which delay 14 and comparator 17 cooperate to gracefully handle time-base errors which exceed the delay capacity of the system. In general, this is achieved by selecting the total delay capacity of switched segmented delay 14 to be at least equal to a basic repetition period of the signal, such as a video line, and operating the switched segmented delay such that a full signal period may be either skipped or repeated as necessary in order to accommodate the excessive phase error. The basic time interval between the synchronizing waveforms is thus preserved such that systems operating in response to the repetitive sync pulses carried by the signal such as in the case of a TV receiver, maintain a proper scanning relationship with the incoming signal information. In connection with the presently described embodiment of the invention, when the phase error of video signal 21 exceeds a line's worth of time, then a full video line from signal 21 is either skipped or repeated as required. An excessive phase error occurs, for example, when the line frequency of the incoming video signal is slightly different than the line frequency of the reference signal. Thus, depending upon the direction in which this frequency error occurs, a video line will be periodically skipped or repeated.

In this manner, together with provision for proper loading of the delay lines as discussed herein, a time increment corresponding to the smallest step delay change can be inserted or removed from the horizontal blanking front porch for repositioning in time the succeeding video line without disrupting the leading edge of the horizontal synchronizing pulse, such as pulse 23, or the analog picture information following thereafter.

Figure 3:
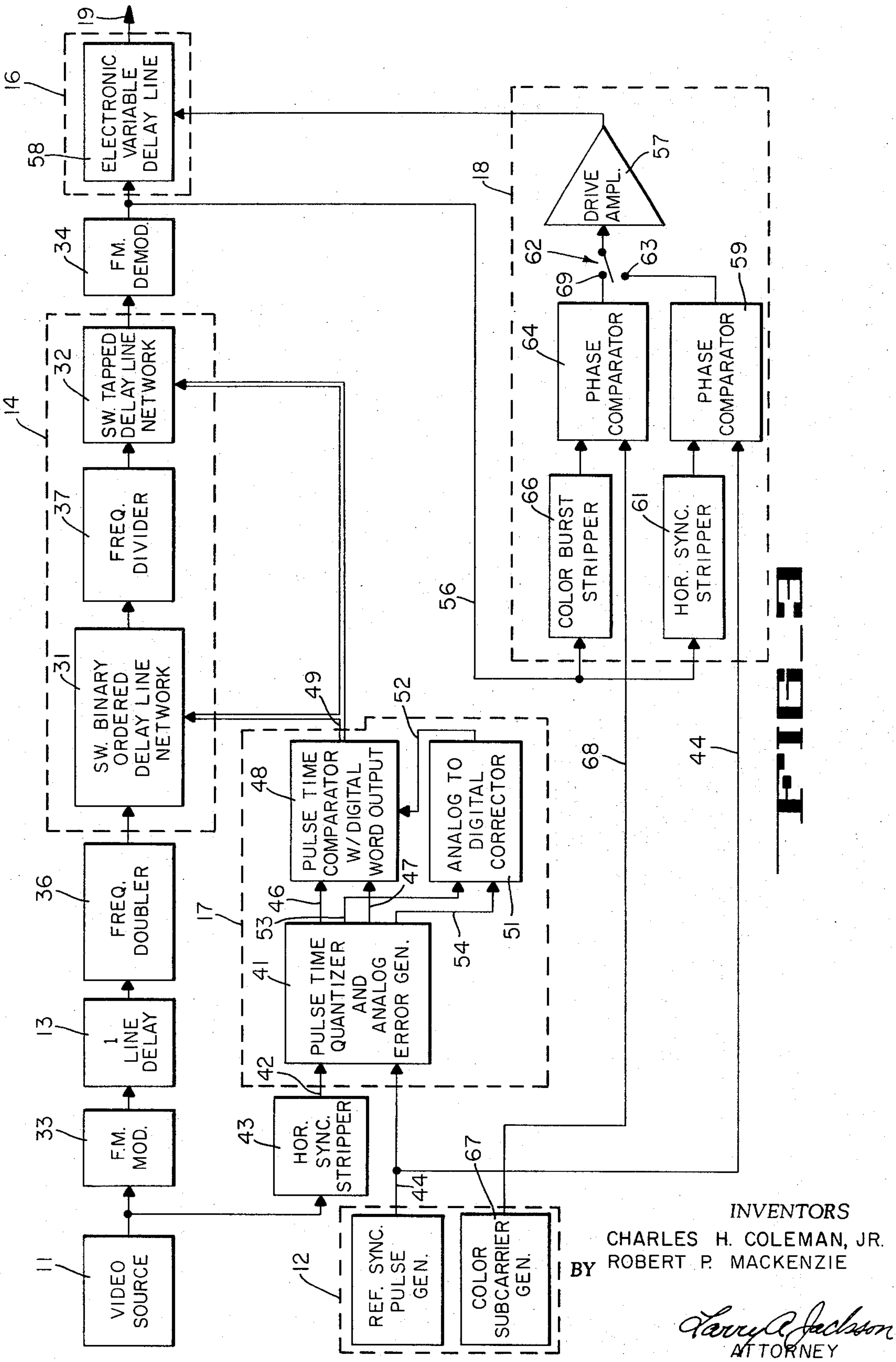
FIG. 3 is another block diagram illustrating in more detail the components of the present invention found in the time-base error correcting system of FIG. 1.

The system of FIG. 1 is illustrated in greater detail by FIG. 3, wherein switched segmented delay 14 is shown to comprise two separate delay line networks: a switched binary ordered delay line network 31 and a switched tapped delay line network 32. Network 31 consists of a plurality of fixed delay lines adapted to be selectively cascaded through the operation of controlled switching means. The highest order line provides a delay period twice that of the second highest order line and similarly on down to the lowest order or shortest period delay line such that the various lines are related by a factor of the power of two and are thus binary ordered. Network 32 comprises a tapped delay line, wherein the taps are provided at equal delay intervals, and switching means adapted to retrieve the delayed signal at any one of the incremental taps. Network 31 by virtue of its binary order provides a heretofore unattainable large delay capacity using a small number of switched delay lines. The time-base error of the incoming video signal may accordingly be reduced from large values down to within the range of the smallest delay increment of network 31. Network 32, having delay increments of equal value, and thus being linearly ordered, serves to further reduce the time-base error of the video signal issued by network 31 down to a range within the capability of electronic variable delay line 16 which performs the final or Vernier time-base error correction on the video signal. While tap delay network 32 could be eliminated in accordance with the present invention, it is preferrably included to provide small step-changes in the effective delay within a limited low level delay range where binary ordered network 31 is not as efficient.

In order to avoid the deleterious effects of amplitude variations in the delay path due to characteristic delay line losses, the signal from video source 11 is initially frequency modulated by FM modulator 33 and subsequentially demodulated by FM demodulator 34 at the output of delay 14. As different types of delay lines are employed depending upon the desired fixed delay interval, and as the frequency response varies among these types of delay lines, the carrier frequency to which the video signal is modulated is changed at certain stages, here by a frequency doubler 36 and a frequency divider 37. For the delay periods mentioned herein, it has been found that modulator 33 preferrably provides a frequency of modulation of 30 megahertz. While frequency modulation has been found most satisfactory in this regard, it will be recognized that other methods of time modulation, such as pulse code modulation (PCM), may be used.

Comparator 17 which provides in this embodiment for measuring the time lead of a video pulse with respect to a reference sync pulse is shown by FIG. 3 to comprise a pulse time quantizer and analog error generator 41 adapted to receive signal sync pulses over a line 42 from horizontal sync stripper 43 and corresponding reference sync pulses over a line 44. As comparator 17 performs a variety of switching operations in response to the signal and reference pulses received via lines 42 and 44, quantizer and analog error generator 41 forces the signal and reference pulses to occupy discrete or quantized times and thereby prevent faulty switching operation of comparator 17 by appropriate phasing of the pulse signals and the various switching transitions. The quantized signal and reference sync pulses are issued over output lines 46 and 47 and are referred to as SS and RS respectively, while the actual time signal and reference sync pulses are referred to as SP and RP respectively. A pulse time comparator 48 provides for measuring lapsed time between successive SS and RS pulses and issues a digital word representative thereof to output connection 49. The digital word carried by connection 49 is extended to and for operating switched delay line networks 31 and 32 to provide an effective delay of the video signal, in accordance with the measured phase difference $T_1$. The delay is selected such that the video signal available at the output of network 32 is sufficiently close in phase to the reference signal so that any final correction required can be performed by continuously variable delay 16.

In accordance with the present invention, comparator 17 also comprises an analog to digital corrector 51 which operates in conjunction with quantizer and analog error generator 41 to insure that for each measurement of pulse separation performed by comparator 48, the digital word output therefrom is a correct representation of the actual SP-RP pulse time separation to within a fraction, in this instance ½, of the least significant bit of the output word. In particular, corrector 51 analyzes the quantizing error between the actual signal and reference pulses appearing on lines 42 and 44 and the quantized pulses issued to output lines 46 and 47 and, if this error exceeds a predetermined threshold level, a bit correction is made via line 52 for increasing the accuracy of the output word from comparator 48.

Output lines 53 and 54 from quantizer and generator 41 feed the analog error signals to corrector 51. In particular, these signals respectively represent the time amount by which each SP preceded its associated SS, referred to as error signal SAL, and the amount of time by which each RP preceded its associated RS, referred to as RAL. The digital word provided by comparator 17 at output connection 49 has a least significant bit selected to be equal to the smallest switchable delay increment provided by delay 14, and corrector 51 together with quantizer and analog error generator 41 insures that such least significant bit reflects the actual time separation between the signal and reference pulses to within a fraction, in this instance ± ½ of the smallest time increment.

Phase comparator 18, as shown by FIG. 3, provides a fine analog measurement of phase differences between the reference signal issued by source 12 and the video signal available on line 56 after the coarse phase correction performed by switched delay 14. For this purpose, and as known per se, comparator 18 comprises a drive amplifier 57 having selected nonlinear input/output characteristics for proper operation of an electronic variable delay line 58. Amplifier 57 has an input responsive to a phase error measurement performed by a phase comparator 59 which, in turn, is responsive to a video horizontal line sync signal from horizontal sync stripper 61 and a corresponding line reference sync signal via line 44. This mode of operation is provided by disposing a switch 62 to connect the input of amplifier 57 to terminal 63 of comparator 59. A more refined phase correction is required for color video signals, and in such case comparator 18 includes a phase comparator 64 having inputs responsive to a color burst stripper 66 and a color subcarrier generator 67, here forming part of reference source 12, extended to an input of comparator 64 via a line 68. For color signal operation, switch 62 is disposed to connect the input of amplifier 57 to terminal 69 whereby the color burst from the video signal at line 56 is compared with the reference color subcarrier from generator 67 and, in response thereto, continuously variable delay corrections are performed by line 58.

Figure 4:
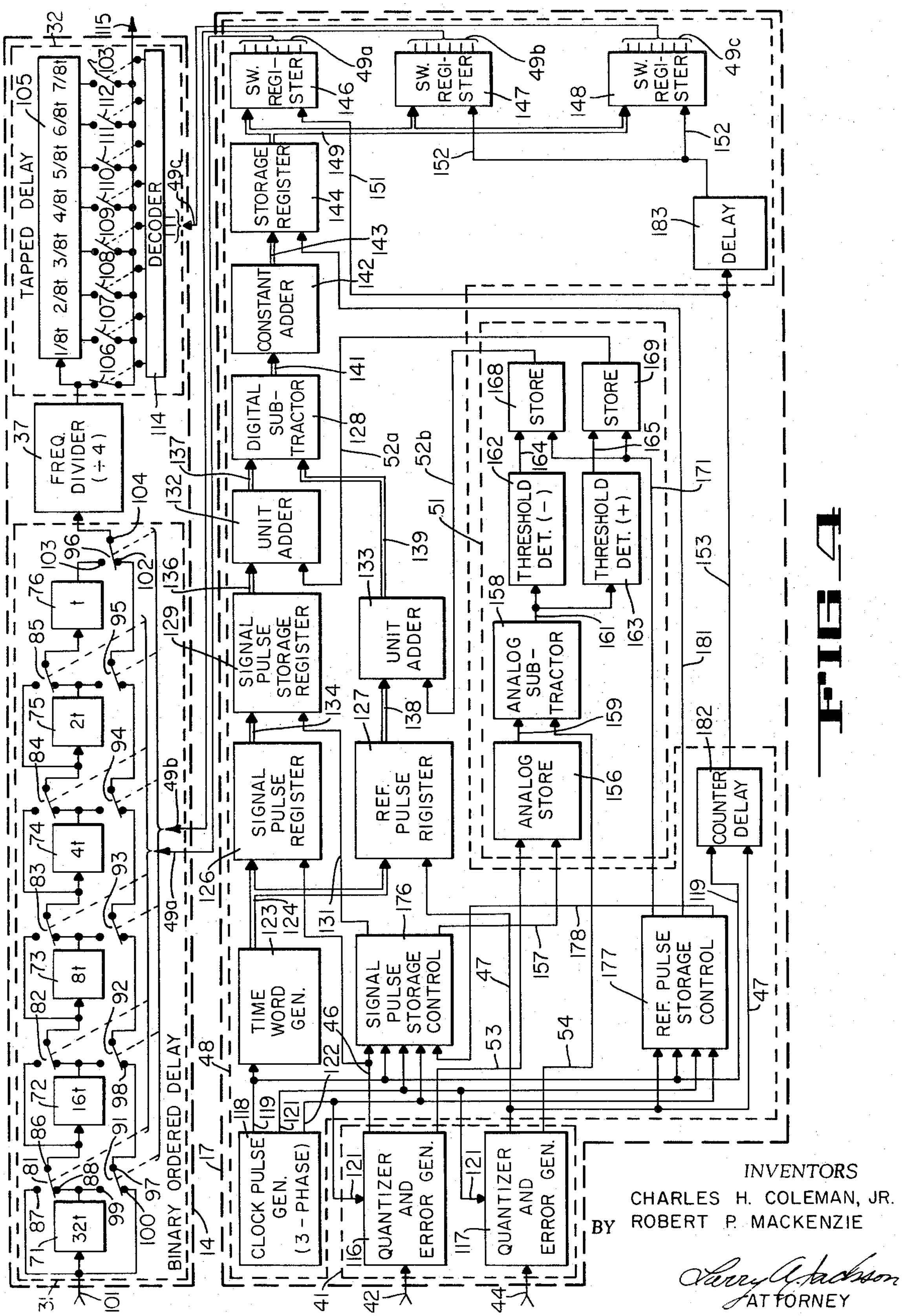
FIG. 4 is a composite block and schematic diagram showing in still greater detail the binary ordered switched delay line network and the time-base error or phase error measurement circuitry arranged and operating in accordance with the present invention.

With reference to FIG. 4, switched binary delay network 31 in accordance with the present invention comprises a plurality of delay units or lines, such as lines 71, 72, 73, 74, 75 and 76. Delay lines 71–46 are selected and arranged to present an effective delay at least equal to the basic time period between adjacent synchronizing waveforms of the subject video signal, or in the more general sense equal to the basic repetitive period of the signal to be delayed. In the presently described embodiment, it is desired to provide time-base error corrections at a line rate basis, and thus delay lines 71–76, together with tapped delay 32, are selected to provide a delay period slightly greater than the period of the video signal line, which has been standardized at 63.5 microseconds. By selecting the maximum delay to be substantially equal to the repetition period, a most efficient use is made of the delay lines. The least significant or smallest delay increment in the binary sequence is set at $t = 1$ $\mu$sec and is provided by line 76. The remaining delay lines 71–75 are accordingly selected to provide delay periods of $=t$, 16$t$, 8$t$, 4$t$ and 2$t$ respectively. Thus, a maximum composite delay of 63 microseconds or approximately one video line period is achieved by serially cascading all of the delay units.

Interconnecting the various delay lines is a first set of switching devices 81, 82, 83, 84 and 85, each having a common terminal, such as terminal 86 for device 81, communicating with the input to a succeeding delay line. One of the fixed terminals of each switching device is connected to the input of a preceding delay unit while the other terminal is connected to the output of the same line, such as shown for terminals 87 and 88 of switching device 81 connected respectively to the input and output of delay line 71. Also provided is a second set of switching devices 91, 92, 93, 94 and 95, each having a common terminal, such as terminal 97 of device 91, which extends to one of the terminals of a succeeding second set switching device, such as shown by terminal 97 of device 91 connected to terminal 98 of device 92. The remaining terminals of each of switching devices 91–95 are respectively connected to the output of a separate one of lines 71–75, such as shown for terminal 99 of switching device 91.

Switching devices 81 and 91 are connected to provide an input to the delay network and thus terminals 87 and 100 are extended to the input of delay line 71 which also forms input 101 of network 31. A final switching device 96 provides for inserting or removing the smallest binary increment delay line 76 by means of terminals 102 and 103 and a common terminal 104 which serves as an output for network 31. The various switching devices 81–85 and 91–96 are operated in response to a binary word issued by comparator 17 over connections 49$a$ and 49$b$ respectively to provide a proper signal delay path through lines 71–76 whereby the video signal appearing at terminal 104 at the output of network 31 is within one binary delay unit, $t = 1$ microsecond, of the desired synchronized relation with the reference signal.

By virtue of this arrangement switching devices 81–85 and 91–96 are selectively operated to provide any required delay, in steps of $t = 1$ microsecond, from 0 to 63 microseconds (0–64 $\mu$sec with taped delay 32 included), and thus correct any possible phase error between the horizontal sync waveforms or pulses of the video signal and reference signal to within 1 microsecond. Moreover, this arrangement of delay lines and switching devices functions in combination with comparator 17 to accommodate phase differences between the video signal and reference signal even though exceeding the maximum delay capacity of network 31 by either skipping or repeating a full line period of the incoming video signal.

Switching device 96 of network 31 serves to insert or remove the smallest delay line 76 and is shown in a position by which line 76 is removed from the signal delay path. Switching devices 91–95 provide selective bypassing of delay lines 71–75 and are designed to be switched together with device 96 at a time immediately prior to each reference sync pulse, when the properly timed video signal is available at the output of the delay network. Switching devices 81–85 function to insert or remove delay lines 71–75 and, as described herein in greater detail, provide for loading delay line 76.

When selectively combining and in particular cascading delay units 71–76, it is necessary to provide for proper "loading" of the video signal to be delayed such that the desired phase or portion of such signal appears at the output of the network at a known time. In other words, when a change of total delay is to be effected by means of changing the cascaded delay units, each successive combination thereof must receive the video signal in advance of the time at which such combination is to be switched to by an interval at least equal to the change of delay time. This requirement is provided by a sequence of operations whereby devices 81–85 are conditioned to be switched at a time preceding the switching of devices 91–96 by an amount substantially equal to the smallest binary delay step, $t = 1$ microsecond. By this arrangement and sequence of operation, the various delay units are properly loaded with the incoming video signal such that at a later time when devices 91–96 are switched, the desired portion of the video signal is emerging from the ouptut of network 31.

Each pair of switching devices associated with the output of same delay line, such as devices 81 and 91, devices 82 and 92, devices 83 and 93, devices 84 and 94, devices 85 and 95, are operated jointly, that is in response to common control signals with only a difference of phase in the operating times thereof, here equal to the smallest binary step change in delay or $t = 1$ $\mu$ sec. With reference to FIG. 2, the time at which devices 91–96 are switched is shown to occur at the end of a fixed delay interval following reference sync pulse 26, and thus corresponding to a time immediately preceding the reference sync pulse next following pulse 26. This switching time also corresponds to the time at which the middle of the front porch of the horizontal blanking pulse is emerging from network 31, assuming no change in the cascaded delay from the preceding switching period. As the front porch of the horizontal synchronizing waveform is, in this instance, 1.6 microseconds wide and thus greater than the smallest binary step delay change, it will be appreciated that the switching of devices 81–85 and 91–96 during this interval does not adversely effect the analog picture information located to the side of the horizontal synchronizing waveforms. This holds true so long as the required and actual binary delay change from line period to line period does not exceed the 1 $\mu$ sec increment. Also, within this operating limit, the horizontal sync pulses, such as pluse 23 in FIG. 2 are not disturbed.

It is thus a characteristic of the present invention that the switching devices 81–85 and 91–96 operate only at discrete clock times, and that such times occur during a portion of the synchronizing waveform of the video signal, so long as the change in delay provided by the network does not exceed the smallest binary delay interval $t$, from one video sync period to the next. Accordingly, in response to a relatively slow changing phase relationship between the video signal to be corrected and the reference signal, the present embodiment can effect nondisruptive time base error corrections over the entire range of the delay network, performing a one microsecond incremental delay correction as often as every video line or less frequently and as required in order to maintain pace with the varying phase error. On the other hand, where there are abrupt changes in phase relationship between the incoming video signal and the reference signal so as to cause a phase error of greater than 1 $\mu$ sec during any given video line interval, this phase error is immediately measured and the delay line networks changed in accordance therewith so that the next video line emerging from the delay networks is properly synchronized. In such case, the step change in delay of greater than 1 $\mu$ sec disrupts one line of video information with the video line following thereafter being resynchronized to the reference signal.

There is an important corollary to the foregoing features of network 31 and comparator 17 and that relates to the switching of the delay lines when the video signal sync rate deviates from the reference sync rate by an amount as measured by phase comparator 17 which exceeds the delay measurement capacity. In such case, switching devices 81-85 and 91-96 are operated operate to provide a delay transition from zero to maximum delay or vice-versa, causing a repetition or skipping, respectively, of a video line. While the change in delay in this instance obviously exceeds the smallest binary delay increment $t = 1$ $\mu$ sec, nevertheless the transition of the various switching devices still occur during the horizontal blanking waveforms and thus do not disrupt remaining portions of the video signal. If the transition is from maximum (63 $\mu$ sec) to zero delay, then a video line is skipped, while a change from zero to maximum causes a repetition of the same video line.

After the coarse correction provided by network 31, the carrier of the frequency modulated video signal is divided down to one-quarter of its previous frequency by divider 37 and thereafter introduced into the input of a network 32. Network 32 is in this instance comprised of a lump constant delay line 105 having a total delay period of at least $7/8t$ and taps at equal delay increments as shown for $1/8t$, $2/8t$, $4/8t$, $5/8t$, and $6/8t$. Alternatively, network 32 can be provided by serially cascaded individual delay lines or devices, each having a characteristic delay equal to $1/8t$ and with the taps taken at each junction therebetween. A plurality of switching devices 106, 107, 108, 109, 110, 111, 112, and 113 function to provide communication between an output 115 of network 32 and one of the taps thereof or the input thereto. By virtue of the linear steps or equal delay increments provided by network 32, step corrections can be performed on the video signal after passing through delay network 31 equal to any multiple of the $1/8t$ increment. In this regard, network 32 is more flexible than network 31 in providing delay corrections over its range of operation from 0 to $t$. Switching devices 106–113 are operated in response to a corresponding number of control signals developed by a decoder 114 which in turn is responsive to binary signals from comparator 17 issued over connection 49*c* as shown.

Figure 5:
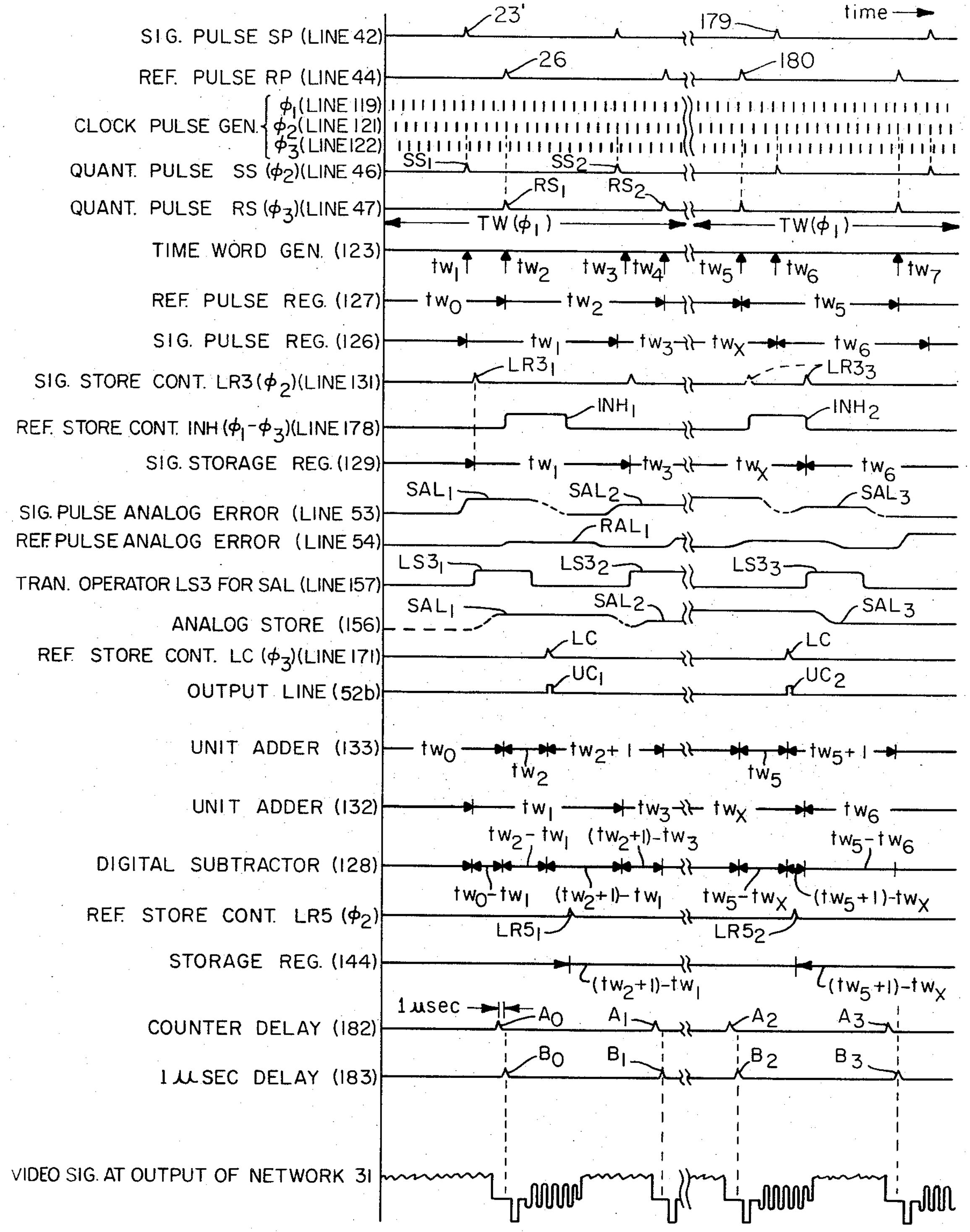
FIG. 5 is another graph illustrating the variety of waveforms exhibited by the components of FIG. 4 during their operation to provide a appropriate delay of the incoming video signal.

In regard to the construction and operation of comparator 17, reference is made to FIGS. 4 and 5. Quantizer and error generator 41 thereof is comprised of a first quantizer and error generator 116 responsive to each signal sync pulse SP, appearing on line 42, such as pulse 23' shown by FIG. 5. A second quantizer and error generator 117 is similarly responsive to each reference sync pulse RP, presented on line 44, such as pulse 26 shown by FIG. 5. The quantizer circuits of generators 116 and 117 are each adapted to receive clock pulses from a three phase clock pulse generator 118. The three respective output pulse phases from generator 118 are issued at output lines 119, 121, and 122, which will be referred to as the first $\phi_1$, second $\phi_2$, and third $\phi_3$, phase clock pulses respectively. In this instance, generators 116 and 117 are connected jointly to receive the second phase clock pulses $\phi_2$ over line 121 as shown. The three phase outputs available from clock generator 118 provide suitable phasing of the various switching functions performed by comparator 17 thus insuring reliable operation thereof. In accordance with the cooperation between clock generator 118 and quantizer and error generators 116 and 117, output lines 46 and 47 provide a second phase clock pulse in response to an immediately preceding SP or RP. This operation is illustrated in FIG. 5 by quantized pulses $SS_1$ and $RS_1$ corresponding to signal pulse 23' and reference pulse 26, respectively. Quantized pulses $SS_2$ and $RS_2$ correspond to subsequent SP and RP pulses. Output lines 53 and 54 generate analog signals $SAL_1$ and $RAL_1$ representing the amount of error introduced by this quantization process.

In order to provide a most efficient unit of measurement for the time separation between the quantized SS and RS pulses appearing on lines 46 and 47, comparator 17 further comprises a time word generator provided by a recycling binary counter 123 which is responsive to the first phase clock pulses $\phi_1$ issued over line 119 to develop a recycling binary word continuously changing in response to $\phi_1$ clock pulses. This recycling binary time word appears at output binary connection 124 and is represented in FIG. 5 by TW($\phi_1$).

A pair of word registers are provided, in the form of a signal pulse register 126 and a reference pulse register 127 connected to receive, in parallel, the binary word output (TW) from generator 123 over line 124. Registers 126 and 127 are also connected to receive the SS and RS pulses over lines 46 and 47 respectively, and in response thereto to store the instantaneous time word appearing on output connection 124 at the occurrence of the quantized pulses. As shown by FIG. 5, register 126 stores time word $tw_1$ in response to $SS_1$, while register 127 stores time word $tw_2$ in response to $RS_1$. The binary difference between the words stored in registers 126 and 127 provides a measure of the number of clock pulses occurring between the time separated signal pulse and reference pulse where this time measure represents the phase error of the video signal with respect to the reference signal.

The time words presented by registers 126 and 127 are eventually subtracted, one from the other, by means of a digital subtractor 128. However, in order to insure that the signal pulse time word, such as $tw_1$ detected by register 126 is available for processing at a time somewhat subsequent to the next RS pulse, a signal pulse storage register 129 is provided which stores the time word initially detected by register 126 in response to a delayed pulse identified as LR3 in FIG. 5 and appearing on a line 131 in FIG. 4.

The above mentioned analog to digital error correction is performed in part by a unit adder 132 serially interposed between register 129 and subtractor 128 and operating in response to a pulse signal received over a line 52*a* from corrector 51. Similarly, the path of the binary word from register 127 to subtractor 128 is serially interposed with a unit adder 133, which is responsive to a pulse signal $UC_1$ received over a line 52*b* from corrector 51 as illustrated by FIG. 5. The signal pulse word, such as $tw_1$, is forwarded over connection 134 to register 129, over connection 136 through adder 132, and over connection 137 to subtractor 128. The reference pulse word, such as $tw_2$, similarly is fed to a subtractor 128 via connection 138, adder 133 and connection 139.

Subtractor 128 performs a binary subtraction of the signal pulse word from the reference pulse word and delivers a difference binary word to output connection 141. For example, difference word $tw_2 - tw_1$, shown by FIG. 5, represents the amount by which signal pulse 23 led the next reference pulse 26. This difference time word available at connection 141 is fed through an adder 142, which adds a constant time in binary form to facilitate certain switching operations of network 31 as discussed herein. A connection 143 feeds the output word from adder 142 to a storage register 144, which stores the modified difference word until the various switching devices of networks 31 and 32 are to be actuated in accordance therewith. For this purpose, the binary difference word is fed to a set of three switch registers 146, 147 and 148, which are adapted to store different bit sets of the complete binary word available on connection 149 for setting the switching devices of networks 31 and 32. Registers 146, 147 and 148 are actuated by sequenced store signals A and B received over lines 151 and 152 respectively, to provide direct switching control of devices 81–85, 91–96, and 106–113. Timing signals A and B are generated at closely spaced intervals as shown by FIG. 5 to provide the desired operating sequence of the three sets of switching devices associated with output connections 49*a*, 49*b* and 49*c*.

Figure 8:
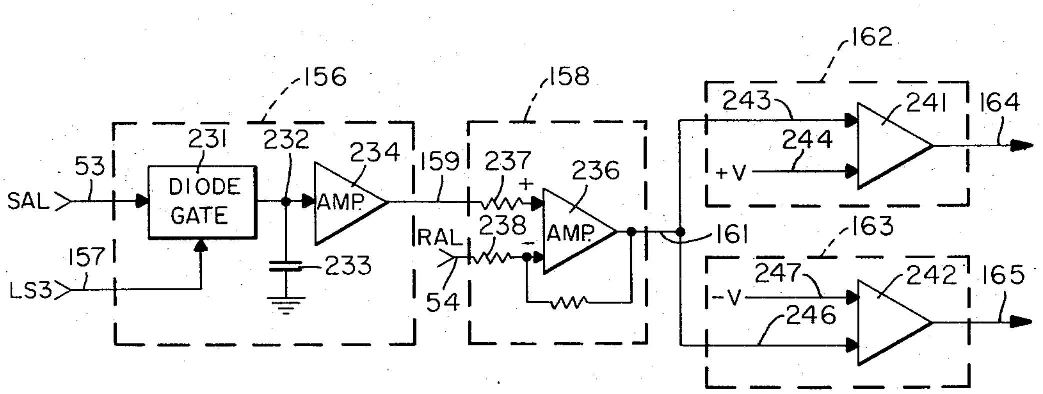
FIG. 8 is a composite schematic and block diagram detailing another block diagram component of the measurement circuitry of FIG. 4.

Analog to digital corrector 51, as shown by FIGS. 4 and 8, comprises an analog store 156 adapted to receive the analog error signal SAL over line 53 representing the amount of time by which a signal pulse SP preceded its associated quantized clock pulse SS. In order to store SAL at the proper time, a store transfer operator signal LS3 is developed on line 157, which is extended to an input of store 156. Corrector 51 further comprises an analog subtractor 158 for subtracting a reference error signal RAL (which represents the time by which a reference pulse RP preceded its quantized clock pulse RS) from SAL where subtractor 158 receives the output of store 156 over a connecting line 159, and jointly therewith receives RAL over line 54. Thus, in FIG. 5, $SAL_1$ is transferred from line 53 to analog store 156 by operator $LS3_1$. $RAL_1$ developed on line 54 in response to RP(26) and $RS_1$, is subtracted from $SAL_1$ by subtractor 158. The resulting difference signal from subtractor 158 is fed via an output line 161 jointly to a pair of opposing polarity threshold detectors 162 and 163. Output lines 164 and 165 of detectors 162 and 163, respectively, each issue a discreet level signal which undergoes a transition in state whenever the input analog signal from subtractor 158 exceeds the threshold level determined by an associated one of detectors 162 and 163. Thus, for example, output line 164 will undergo a switching transition conditioning a store 168 to issue a bit correction pulse when the analog difference signal appearing at the output of subtractor 158 exceeds a predetermined threshold level in a negative polarity sense. Lines 164 and 165 are respectively extended to a pair of logic gate stores 168 and 169 which, in turn, have outputs communicating with output lines 52*a* and 52*b* of the corrector 51. The logic signals on lines 164 and 165 applied to unit adders 132 and 133 are changed at a discreet clock time provided by the response of stores 168 and 169 to a clock signal LC received over a line 171. LC indicates a new lead word has been developed, and the new correction associated therewith should be applied.

In accordance with the operation of corrector 51, if there is a large difference in the magnitudes of SAL and RAL reflecting a correspondingly large difference in the times by which the SP and RP pulses preceded their associated SS and RS pulses, then depending upon the polarity in which the difference occurs, either detector 162 or detector 163 is conditioned to issue a corrective logic signal to the associated one of output lines 164 and 165. This discrete state corrective signal when loaded into the appropriate one of stores 168 and 169 at the proper time, is added to either the signal pulse time word or the reference pulse time word depending upon whether the correction is to increase the time word difference at the output of subtractor 128 or decrease such difference word. In particular, the circuitry is designed such that if the amount by which SP led its SS minus the amount by which RP led its RS is greater, either negatively or positively, by more than one-half the period of the clock pulses, then a unit bit is added to one of the time word paths to increase or decrease the difference time word as required. By virtue of analog corrector 51, the difference time word representing the signal-reference phase error is accurate to within ± one-half the value associated with the least significant binary bit or in the present embodiment $\pm 1/16$ $\mu$sec. In the absence of corrector 51, the time word difference would be only accurate to ± the full value of the least significant bit, or in the present case $\pm 1/8$ $\mu$ sec.

Figure 9:
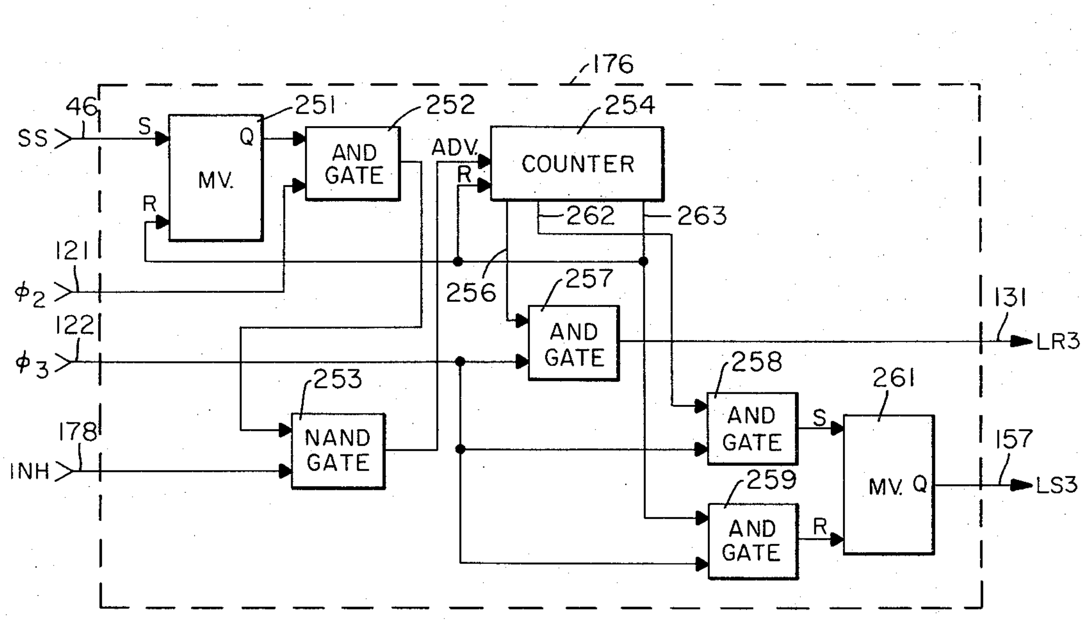
FIG. 9 is still a further block diagram illustrating in detail the construction of another component of the measurement circuitry of FIG. 4.
Figure 10:
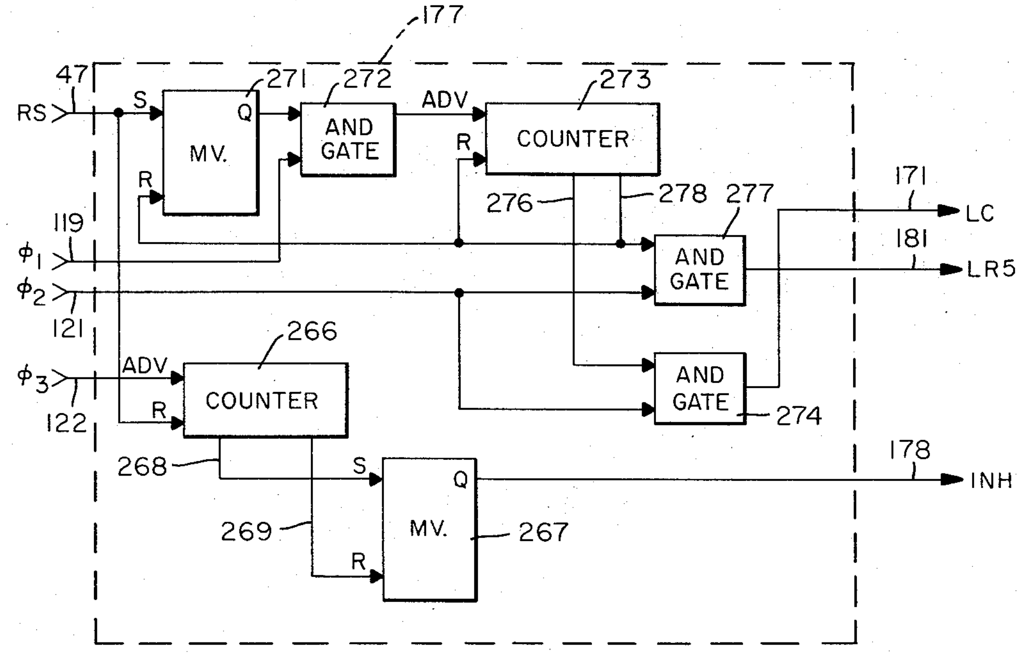
FIG. 10 is another detailed block diagram of still another component of the circuit shown by FIG. 4.

In order to properly time the various switching operations performed by comparator 17, and thus insure reliable phase measurement of the incoming video signal, a pair of timing control circuits are provided as shown by signal pulse storage control 176 (FIGS. 4 and 9) and reference pulse storage control 177 (FIGS. 4 and 10). Control 176 is adapted to receive the quantized signal pulse SS over line 46, each of the three-phase clock pulse trains over lines 119, 121, and 122, and an inhibit signal INH from line 178 interconnecting controls 176 and 177. In response to these various input signals, control 176 issues a signal storage control signal LR3 for causing a transfer of the signal word from register 126 to 129, where signal LR3 is a second phase ($\phi_2$) clock pulse conditioned to occur a short time after each quantized signal pulse SS. Thus, in FIG. 5, signal $LR3_1$ provides for storing $tw_1$ from register 126 into register 129.

Control 176 also provides for issuing the transfer operator signal LS3 over a line 157 to and for causing analog store 156 to store each analog error signal SAL. Operator signal LS3, during normal operation, is a rectangular pulse of sufficient timewidth to allow full transfer of a maximum amplitude analog error signal SAL into store 156. Pulse LS3 is timed to follow directly behind quantized signal pulse SS.

Reference pulse storage control 177 is adapted to receive the quantized reference pulse RS over line 47, and each of the three-phase clock pulse trains via lines 119, 121 and 122. In response to these various pulse signals, control 177 provides among other operations for issuing the gating signal LC over line 171, wherein such signal is $\phi_3$ clock pulse following RS by several microseconds. The LC clocking pulse is delayed with respect to the RS pulse to allow completion of the analog to digital operations associated with store 156, subtractor 158 and detectors 162 and 163. In addition, control 177 provides over output line 181 a pulse signal LR5 for effecting a transfer of the difference time word from the output of constant adder 142 to storage register 144. This storage transfer pulse LR5 is a $\phi_2$ pulse conditioned to occur several microseconds after the LC pulse and thus after the analog to digital correction provided by corrector 51 has been performed. Finally, control 177 provides for inhibiting the various signal outputs of storage control 176 for a preselected time period following each quantized reference pulse RS. This inhibit operation is provided over line 178 and takes the form of an inhibit pulse waveform INH initiated by each RS pulse and lasting for several microseconds thereafter. The inhibiting function prevents the loss of signal time words and analog error signals when the RS and SS pulses are approximately coincident.

For example, FIG. 5 illustrates the operation of control 177 in response to a reference pulse 179 closely followed by a signal pulse 180, where an inhibit waveform $INH_2$ causes a signal word store control pulse $LR3_3$ and a transfer operator $LS3_3$ to be delayed until the preceding analog error correction is performed on the time words $tw_5$ and $tw_x$ by bit correction pulse $UC_2$. The delayed operation of LR3 and LS3 preserves the analog information stored in analog signal store 156 prior to transfer of $SAL_3$ and the time word in register 129 prior to storing $tw_6$ until comparator 17 has issued the proper output time word associated with the signal pulse preceding pulse 179. The inhibit pulse $INH_2$ associated with reference pulse 26 is not needed and is thus ineffectual for delaying $LR3_1$ and $LS3_1$.

As mentioned above, the present invention operates to change the cascading of the various delay lines of networks 31 and 32 during the synchronizing waveform of the video signal so as not to disrupt picture information or the critical timing portion of the sync pulse. In particular, comparator 17 provides for modifying the contents of switch registers 146, 147, and 148 at times immediately preceding each reference pulse RP such that the switching devices of networks 31 and 32 operate during an interval corresponding to the front porch of the horizontal line synchronizing waveform as shown and described with reference to FIG. 2 above. For this purpose, comparator 17 further comprises a counter delay 182 which is adapted to respond to each quantized reference pulse RS and thereupon count $\phi_1$ clock pulses received over line 119 until a preselected pulse count is reached corresponding to an interval just short of the expected time of the next video sync pulse from network 31. In the present embodiment, this delay interval is set at 61.75 microseconds and thus just under the 63.5 microseconds corresponding to a full line period. Accordingly, delay 182 provides a storage transfer pulse signal A to line 151 for setting register 146 with the binary control word made available by the prior LR5 pulse transfer operation at storage register 144. The switching devices associated with registers 147 and 148 are operated 1 microsecond later by a pulse signal B which is delayed from the A pulse by a fixed delay 183. As shown, delay 183 is serially connected between lines 151 and 152.

While the switching arrangement shown by FIGS. 4 and 5 and described above is preferred, there are applications where the phasing between the first set of switching devices 81–85 and the second set of devices 91–96 may be simplified without unacceptable disruption of the delayed signal. In particular, it is possible to eliminate one of registers 146 and 147 and delay 183 and operate both the first and second set switching devices 81–85 and 91–96 at the same time without an intervening phase delay. This will result in certain changes in the delay path producing an interval, equal to one unit period ($t = 1$ microsecond) in length, occurring immediately following the switching time wherein the signal information is incorrectly timed and is not contiguous with the succeeding signal information. In applications in which this false or mistimed information may be ignored or blanked out, the resulting simplification of the system would be advantageous.

With reference to FIG. 5, the foregoing operation is shown by pulses $A_1$ and $B_1$ which set registers 146, 147 and 148 with delay time word $[(tw_2+1)-tw_1]$, and pulses $A_3$ and $B_3$ which set the respective registers with a delay time word $[(tw_5+1)-tw_x]$. In each case, it is assumed that the difference time word has not changed by an amount greater than one period ($t = 1\ \mu$ sec) from the preceding value such that the registers are switched at times shown by FIG. 5 which fall within the horizontal front porch of the video signal as it emerges from network 31.

Thus far in the description of the invention, it has been shown that network 31 is adapted to provide a variable delay range in steps equal to the smallest binary delay increment and that comparator 17 is adapted to measure the phase error between the video and reference signals and develop a binary signal word representative thereof. Considering now the relationship between the binary word output of comparator 17 and the switching devices of network 31, it is noted that the switching devices must be disposed in a condition for providing generally the same delay which is measured and registered at the output of comparator 17. For this purpose, it has been found that a unique relation exists between the binary word developed by comparator 17 and a binary coded representation of the switching positions of devices 81–85 and 91–96 of network 31. In particular, it has been found that when the measured phase difference or lead between a video sync pulse and a horizontal sync pulse is registered in a standard binary word format, that such binary word may with slight modification be directly applied to and for changing the individual states of the various switching devices of network 31 to set the effective delay equal or proportional to the measured phase lead. Thus as the binary word represents the amount of time by which each signal pulse leads the next following reference pulse, the word will undergo a transition from maximum to minimum or vice-versa as the reference and signal pulses go through timing coincidence. Similarly, the switched delay lines of network 31 undergo a switching transition equal or proportional to the measured error, namely one full video line or period to zero delay or vice-versa.

The switching states of each pair of associated switching devices 81–91, 82–92, 83–93, 84–94, and 85–95 and the terminal switching device 96 are each assigned a bit location within a binary word. In this instance, the binary word has six bits of descending significance starting with paired devices 81–91 as the most significant binary bit position. Furthermore, the switching disposition of each of the devices is assigned one of two logic states "1" and "0" respectively. In the present embodiment, the "1" state corresponds to the disposition of the switching devices as shown by FIG. 4, that is with the common arm in the lower position. Accordingly, the "0" state corresponds to the respective switching devices being in a condition opposite that shown by FIG. 4, that is with the common arm in an upper position. By this arrangement, the following switching code chart illustrates the effective delay provided by network 31 in accordance with the above defined code.

SWITCHING CODE (Network 31)

| Binary Code Representing Switch Position | | | | | | Effective Delay µsec |
|---|---|---|---|---|---|---|
| 0 | 0 | 0 | 0 | 0 | 0 | 1 |
| 0 | 0 | 0 | 0 | 0 | 1 | 2 |
| 0 | 0 | 0 | 0 | 1 | 0 | 3 |
| 0 | 0 | 0 | 0 | 1 | 1 | 4 |
| 1 | 1 | 1 | 1 | 0 | 1 | 62 |
| 1 | 1 | 1 | 1 | 1 | 0 | 63 |
| 1 | 1 | 1 | 1 | 1 | 1 | 0 |

With reference to comparator 17, the phase error measurement (or the amount by which each SP led its RP) appears at the output of digital subtractor 128 and is in the form of a standard binary code. With reference to the following chart, this binary word consists of nine bits. The first six most significant bits represent the delay to be provided by network 31 and the three least significant bits correspond to fractional microsecond changes provided for by selective switching of tap delay network 32.

PHASE ERROR CODE (COMPARATOR 17)

| Binary code rep. lead error | | | | | | | | | Measured lead, µsec. |
|---|---|---|---|---|---|---|---|---|---|
| Network 31 | | | | | | Network 32 | | | |
| 32 | 16 | 8 | 4 | 2 | 1 | ½ | ¼ | ⅛ | |
| 0 | 0 | 0 | 0 | 0 | 0 | 0 | 0 | 0 | 0 |
| 0 | 0 | 0 | 0 | 0 | 0 | 0 | 0 | 1 | ⅛ |
| 0 | 0 | 0 | 0 | 0 | 1 | 0 | 0 | 0 | 1 |
| 0 | 0 | 0 | 0 | 1 | 0 | 0 | 0 | 0 | 2 |
| 0 | 0 | 0 | 0 | 1 | 1 | 0 | 0 | 0 | 3 |
| 1 | 1 | 1 | 1 | 0 | 1 | 0 | 0 | 0 | 61 |
| 1 | 1 | 1 | 1 | 1 | 0 | 0 | 0 | 0 | 62 |
| 1 | 1 | 1 | 1 | 1 | 1 | 0 | 0 | 0 | 63 |

A comparison between the first six bits of the phase error code with respect to the six bits representing the switching states for network 31 reveals that the two codes are identical except for a one binary unit difference therebetween. That is, if the switching code for network 31 were increased by one binary bit, then the measured lead provided by comparator 17 and the effective delay provided by network 31 would be represented by the same binary coded word. This transformation is achieved by a constant adder 132 of comparator 17 connected between subtractor 128 and the output registers of the comparator circuitry.

In actual practice, adder 132 is conditioned to effect a digital subtraction of ⅞ µ sec from the digital word rather than the full 1 µ sec suggested by the above description. This allows a digital word residue of + ⅛ µ sec when a zero phase relation between SS and RS is measured so that in the event a − ⅛ µ sec correction is made by analog to digital corrector 158, the difference time word will not go in a negative sense to the adjacent maximum digital word state and thereby cause a large erroneous delay on network 31.

The output binary word passed to registers 146 and 147 consists of six bits for control of network 31. Register 146, which operates switching devices 81–85, carries only the first five most significant bits and these are passed over connection **49*a* to the first or upper set of switching devices 81–85 respectively. Register 147 receives the first six most significant bits of the binary word and provides for operating the second set of switching devices 91–96 individually in accordance with each corresponding bit. These six binary states are passed from register 147 to the switching devices by way of connection 49*b*. Finally, the three least significant bits provide for switch delays less than 1 microsecond and are received by register 148 for connection to and operation of switching devices 106–113 of tapped line network 32. These last three binary bits of the output word are carried to a decoder 114 of network 32 over connection 49*c*, wherein decoder 114 develops eight separate signals for operation of devices 106–113.**

In view of the foregoing, it is noted that one of the characteristics of this preferred embodiment of the invention is that the time word TW relative to which comparator 17 performs the phase error measurement has a minimum clocking period equal to the smallest delay increment ⅛ µ sec of switched delay 14. In other words, comparator 17 may be thought of as measuring the relative signal to reference phase relationship against a signal having its shortest timing period equal to the smallest delay change available, with periods of ascending time order corresponding to each binary ordered delay level provided by network 31. This unique relationship between the clocking periods of the signal used as a measure of the phase error and the delay increments provided by delay 14 permits a most efficient construction of the phase measurement means, here in the form of comparator 17. Furthermore, other circuits satisfying this timing relationship can be employed in place of comparator 17. For example, the reference pulses may be used as the basic clock and the time interval between successive reference pulses divided by cascaded bistable devices down to a minimum clocking interval equaling the delay of the smallest switched delay line. The magnitude of the phase error would be measured by the state of the bistable devices at the occurrence of the signal pulse. However, it is preferred to employ an externally controlled clock pulse generator as in the present embodiment, so that a stable and accurate time reference is available.

Figure 6:
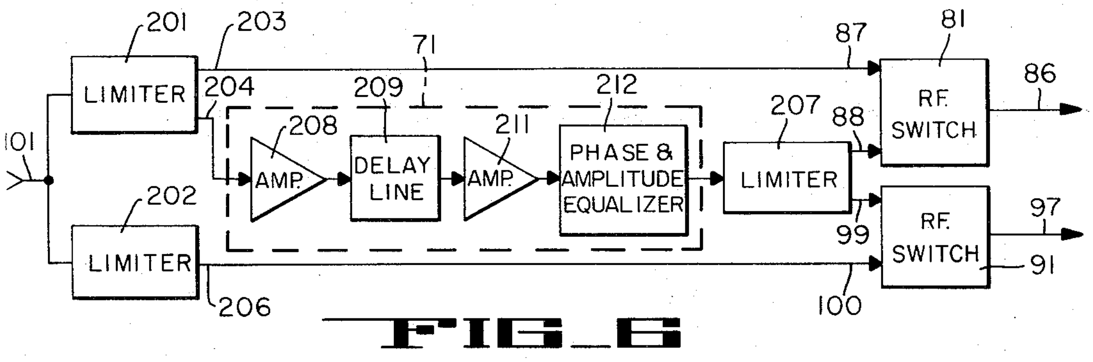
FIG. 6 is a block diagram detailing the individual components used in making up a section of the switched binary delay components of FIG. 4.

With reference to FIG. 6, a section of delay network 31 is shown to comprise a variety of components for controlling and compensating losses to the modulated video signal as it proceeds through the network delay line and switching device. In particular, FIG. 6 shows the section of delay network 31 comprising delay line 71 and switching devices 81 and 91. The modulated video input is received at network input 101 and jointly fed to the inputs of amplitude limiters 201 and 202, wherein limiter 201 has a pair of balanced outputs 203 and 204 while limiter 202 has a single output 206 as shown. Switching devices 81 and 91 are preferably electronic RF switches comprising high speed solid state switching components and associated circuitry as known to those skilled in the art. RF switch 81 thus provides for selectively communicating common terminal 86 with an RF signal available at terminal 87 from limiter 201 or with a delayed RF signal available at terminal 88. Similarly, RF switch 91 functions to connect common terminal 97 with either an RF signal from limiter 202 available at terminal 100 or a delayed RF modulated video signal at terminal 99. The delay signal path for the incoming signal is provided from output 204 of limiter 201 through delay unit 71 to a limiter 207 having a pair of balanced outputs extended to terminals 88 and 99 respectively of switching devices 81 and 91. Delay unit 71 is in this instance formed by a driving amplifier 208, the actual delay line or device 209, a further amplifier 211 and a phase and amplitude equalizer 212. The foregoing components cooperate so as to transfer the frequency modulated signal information from input 101 to either output terminals 86 or 97 without loss or distortion of information.

For signal delays in the range of 1 to 32 microseconds, it has been found that delay lines of the ultrasonic type are preferred. Thus, each of the delay units 71–76 of network 31 are in this instance comprised of ultrasonic delay lines. As the delay provided by network 32 is less than 1 microsecond, it is practical and in fact preferred to use a conventional lumped constant tapped delay line in combination with individual limiter and compensator circuits associated with each delay section. For delay ranges greater than 32 microseconds, such as for the circuit described herein in connection with FIG. 11, it is preferred that polygonal ultrasonic delay devices be employed due to the greater delay capacity afforded by the folded delay path feature of such devices. For further information regarding selection of the various delay lines and devices, reference is made to an article in the proceedings of the IEEE, entitled A SURVEY OF ULTRASONIC DELAY LINES OPERATING BELOW 100 Mc/s, Volume 53, Number 10, Oct. 1965.

Figure 7:
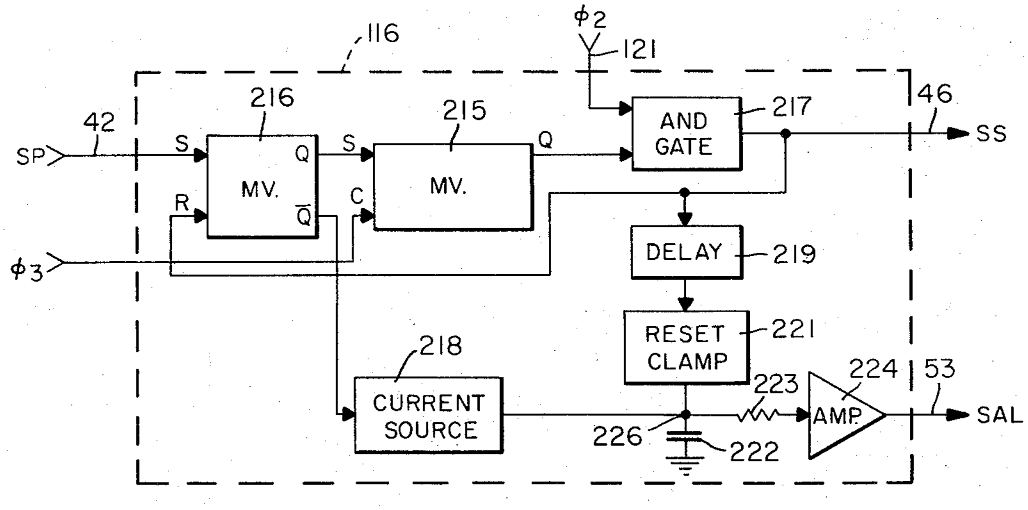
FIG. 7 is a block diagram showing in more detail one of the block units used in the phase measurement circuitry and shown in FIG. 4.

With reference to FIG. 7, a circuit suitable for performing the operations of quantizer and error generator 116 is shown. An identical circuit may be employed for quantizer and error generator 117. In particular, quantizer and error generator 116 in this instance includes a bistable multivibrator 216 having a set input responsive to each signal pulse SP appearing on line 42 and a reset input responsive to the occurrence of a quantizer output pulse SS at line 46. An AND gate 217 has a pair of inputs respectively responsive to $\phi_2$ clock pulses at line 121 and the Q output of multivibrator 216 to issue one of the $\phi_2$ clock pulses when multivibrator 216 is switched by an incomping SP. A clocked multivibrator 215 is disposed between multivibrator 216 and gate 217 and is conditioned by a $\phi_3$ clock pulse to insure that the input AND gate 217 changes at a time phased with respect to a leading edge of a $\phi_2$ clock pulse upon which the quantized signal pulse SS is based. Thus, the Q output of multivibrator 215 which controls AND gate 217 changes upon a $\phi_3$ clock pulse received at an input c thereof if the Q output of multivibrator 216 has switched state prior thereto in response to an incoming SP pulse. As soon as the quantized signal pulse SS occurs, multivibrator 216 is immediately reset. The signal analog lead error SAL is developed at output line 53 by means of the cooperation between a current source 218 adapted to be turned on and off by the Q output of multivibrator 216, a fixed delay 219 initiated by each SS pulse, a reset clamp 221 responsive to delay 219 and a capacitive charging circuit here consisting of a capacitor 222, a resistor 223, and an isolation amplifier 224. In operation, current 218 is turned on in response to switching of multivibrator 216 in response to an incoming SP pulse. A constant current is thus issued by source 218 to a junction 226 charging capacitor 222 to a potential increasing with the lapse of time. When an SS pulse is issued after the SP pulse, multivibrator 216 is reset, turning source 218 off and thus terminating the mounting charge on capacitor 222. Resistor 223 together with amplifier 224 maintains the charge on capacitor 222 which appears as an output voltage SAL representing the amount of time between SP and SS. To restore the circuit for the next signal pulse, delay 219 responds to the occurrence of the quantized signal pulse and, after an interval of approximately 4 microseconds, delay 219 activates reset clamp 221 which in turn discharges the potential on capacitor 22, thus restoring the circuit for the next incoming pulse sequence.

Analog store 156, analog subtractor 158 and threshold detectors 162 and 163 of comparator 17 may be implemented by a circuit as illustrated by FIG. 8. Particularly, FIG. 8 shows analog store 156 being formed of a diode gate 231 which is responsive to a gating signal LS3 on line 157 to pass the signal analog error SAL at line 53 to a junction 232 associated with a capacitive charging circuit. When SAL is passed to junction 232, a capacitor 233 is charged to the voltage of SAL and maintained in that condition by an isolation amplifier 234. In this manner the signal SAL is stored by analog store 156 and is made available at the output of amplifier 234 which is extended to line 159.

Analog subtractor 158 is shown to be provided by a summing amplifier 236 having a pair of input summing resistors 237 and 238 respectively connected to line 159 associated with SAL and line 54 carrying RAL. Resistors 237 and 238 are extended to opposing polarity inputs of amplifier 236 such that the signals SAL and RAL are subtracted. Detectors 162 and 163 comprise saturable summing amplifiers 241 and 242 which are biased to detect preselected thresholds of the analog difference signal appearing at line 161 at the output of subtractor 158. In particular, saturable amplifier 241 is connected to receive the output of subtractor 158 via an input 243 and is connected at an input 244 to receive a biasing signal of positive polarity and a preselected magnitude +V. The voltage level +V is such that amplifier 241 saturates at a predetermined threshold level of the voltage at line 161 and causes a stepchange in voltage to appear at output line 164 representing a negative excursion of the difference between SAL and RAL beyond the threshold. Similarly, amplifier 242 is responsive to the analog difference signal at an input 246 and to the negative polarity of the preselected biasing voltage −V at an input 247 to issue a step-change signal at output line 165 representing a positive excursion of the threshold difference between SAL and RAL. The output signals at lines 164 and 165 thus appear as switching signals which are transmitted on command by means of stores 168 and 169 to the appropriate one of unit adders 132 and 133. As noted above, the threshold levels for detectors 162 and 163 are set to equal the analog voltage corresponding to a time of one-half the characteristic period between adjacent clock pulses of like phase, or the basic clock period.

Referring to FIG. 9, a detailed block diagram of the logic circuitry for control 176 of comparator 17 is shown. Control 176 develops a LR3 ($\phi_3$) pulse at output line 131 in response to a quantized signal pulse SS at line 46. For this purpose, a bistable multivibrator is set by each incoming SS pulse. An AND gate 252 is responsive to the switched condition of multivibrator 251 to pass $\phi_2$ clock pulses available at line 121 through AND gate 252 and a NAND gate 253 to an advance input of a counter 254. Accordingly, counter 254 advances in its counting level and after a predetermined number of $\phi_2$ clock pulses, in this instance two, an output is issued over a line 256 which operates an AND gate 257 to allow a $\phi_3$ clock pulse to pass from line 122 to output line 131 and thereby provide the LR3 control pulse. AND gate 257 is rendered nontransmissive when counter 254 proceeds to the next counting level, thus allowing only a single $\phi_3$ pulse to pass to output line 131 for each incoming quantized signal pulse SS.

Control 176 also provides for issuing the analog store transfer operator LS3 at output line 157. To accomplish this function, a pair of AND gates 258 and 259 are provided having outputs connected to respectively set and reset the state of a multivibrator 261. AND gate 258 has one of its inputs connected to a preselected counting state of counter 254 by means of line 262 and thereby functions to pass a $\phi_3$ clock pulse applied at the other input of gate 258 when counter 254 activates line 262. This sets multivibrator 261 causing its Q output to switch, thus creating the leading edge of the LS3 signal at line 157. Multivibrator 261 is reset thus terminating the LS3 signal by means of gate 259 having one of its inputs connected to a preselected counting state of counter 254 over a line 263 which functions to condition AND gate 259 to pass a $\phi_3$ clock pulse to the reset input of the multivibrator. The number of counting levels between lines 262 and 263 represents the width of the LS3 pulse which, as noted above, is selected here to be in the range of 2 to 3 microseconds. Line 263 from counter 254 is also fed back to and for resetting the counter and for resetting multivibrator 251 at the end of the above described switching sequence.

The operation of control 176 is inhibited by means of inhibit signal INH received from control 177 at line 178. If the quantized signal pulse SS occurs too closely behind the quantized reference pulse RS, then NAND gate 253 receives an inhibit signal at one of its inputs which thereby blocks the connection between AND gate 252 and the advance input to counter 254. This condition remains until the inhibit signal is removed allowing counter 254 to advance in response to $\phi_2$ clock pulses.

A block diagram of the logic circuitry for reference pulse storage control 177 is shown by FIG. 10. To develop inhibit pulse signal INH at output line 178, control 177 comprises a counter 266 having advance and reset inputs responsive to $\phi_1$ clock pulses at line 119 and the incoming RS pulses at line 47 respectively. A low counting state is connected to set a multivibrator 267 over a line 268 and a higher counting state is connected for resetting the multivibrator over a line 269. Line 178 is connected to the Q output of multivibrator 267 such that the signal INH is initiated at a low counting state when counter 266 issues a a a signal over line 268 and is terminated when counter 266 reaches a preselected counting state at which line 269 is energized to reset multivibrator 267. In the present embodiment, the line 268 is connected to respond to the first $\phi_1$ clock pulse following a RS ($\phi_2$) pulse while line 269 is connected to a state of counter 266 selected to provide approximately 5 microseconds between setting and resetting of multivibrator 267.

Control 177 functions to issue an LC pulse, which is a $\phi_3$ pulse, at a time approximately 3 microseconds after each incoming RS pulse. For this purpose, a bistable multivibrator 271 is set in response to each incoming RS pulse received over line 47. An AND gate 272 functions in response to the switching of multivibrator 271 to pass $\phi_2$ clock pulses received over line 121 to an advance input of a counter 273. A further AND gate 274 has one of its inputs connected to a preselected state of counter 273 over a line 276 and the other of its inputs connected to receive $\phi_3$ clock pulses from line 122 such that the LC pulse is a $\phi_3$ clock pulse occurring when counter 273 energizes line 276 and hence gate 274. In a similar manner, control 177 operates to issue the LR5 pulse at line 181 by means of an AND gate 277 which has one of its inputs connected over a line 278 to a preselected counting state on counter 273 and the other of its inputs connected to receive $\phi_3$ clock pulses over line 122. The counting state corresponding to lines 276 and 278 are selected to position the LR5 pulse at a time approximately 1 microsecond after the LC pulse in the present embodiment. Line 278 is also fed back to the reset inputs of multivibrator 271 and counter 273 to reset these devices at the time the LR5 pulse is issued, thus restoring the circuit for responding to the next incoming quantized reference pulse RS.

Figure 11:
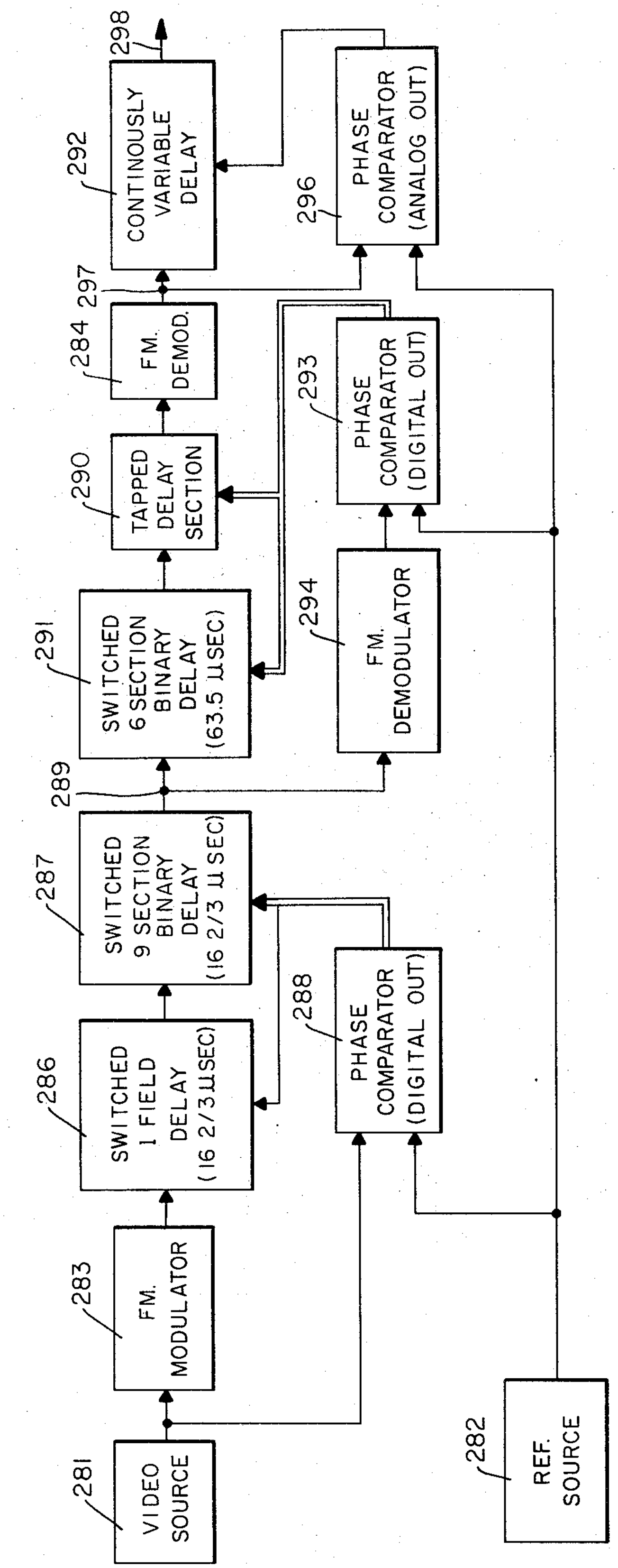
FIG. 11 is a block diagram of a further embodiment of the invention having an expanded delay capacity over that of the system shown by FIG. 1.

With reference to FIG. 11, an embodiment of the present invention is illustrated in which the delay range capacity has been expanded to permit complete synchronization of a nonsynchronous television signal with a locally generated reference source signal. In such case, it is necessary to provide a delay capacity equal to the basic repetition period, that is the period of the lowest frequency periodic waveform carried by the signal. In the case of a video signal, the basic repetition period is one frame or 33-⅓ milliseconds for a 525/60 scanning standard. A system having a delay capacity equal to or greater than this frame period is capable of fully synchronizing any two video signals having any possible frame-to-frame phase relationship or error. As the time-base correction in this instance is usually large, the system may be thought of as a video signal buffer adapted to be interposed between a local synchronizing standard and an incoming remotely originated video signal for synchronizing the latter to the former. With particular reference to FIG. 11, the time-base error or buffering system is adapted to receive a video signal source 281 and a reference signal source 282 as in the system shown and described in connection with FIG. 1. The video signal is first frequency modulated by modulator 283 and after being fed through the switched variable delay lines is demodulated by demodulator 284. In accordance with the binary ordering of the switched delay units of the present invention, the first delay is provided by a switched one field delay 286 (corresponding to 16-⅔ milliseconds) or ½ the basic repetition period of the input video signal. Thus delay 286 consists of a fixed delay line or unit which is selectively switched in or out of the serial signal path. After switched delay 286, the video signal is fed through a switched nine section binary delay 287 which functions to reduce the phase error to a range within one video line. In particular, delay 286 and delay 287 cooperate together and may be thought of as composing a ten section switched binary ordered delay network in which the first section provides a delay of 16-⅔ milliseconds; a second delay (corresponding to the first delay section of delay 287) provides one-half 16-⅔ milliseconds or 8-⅓ milliseconds; etc., down to the smallest delay line of delay 287 which provides a delay interval of approximately 32 microseconds. Thus, after delay 286 the video signal is within one field, or 16-⅔ milliseconds, of a synchronized condition. After delay 287, the signal phase error is further reduced and is now within 32 microseconds of a frame-by-frame synchronized condition with the reference signal. A phase comparator 288 functions to measure the framing error between the video source signal and the reference source signal and provide a digital output signal to and for switching delays 286 and 287 in a manner disclosed by the above described operation of comparator 17. As in the case of comparator 17, comparator 288 operates to switch the cascaded delay lines of delays 286 and 287 at a time within the synchronizing waveforms of the video signal, and more particularly at a time during the vertical synchronizing waveforms.

The video signal at junction 289 is thus within a fraction of a video line period of the reference signal. At this point, a switched six section binary delay having a delay capacity of 63.5 microseconds or one video line, receives the signal and further reduces the phase error to within the delay capability of a continuously variable delay 292, corresponding to continuously variable delay 16 described in connection with FIGS. 1 and 3. Switched six section binary delay 291 may be provided by an arrangement similar to network 31 of switched delay 14 while a tapped delay 290 similar to delay network 32 may be used as shown here and as described above with reference to FIGS. 1 through 10. Delays 291 and 290 are operated by a phase comparator 293 which has a construction and operation like that of comparator 17 described above. In order to provide an accurate measure of the phase error for determining the necessary setting of delay 291, a new phase error measurement is performed by comparator 293. Particularly, after the timing error has been reduced to a certain predicted amount by delays 286 and 287, the video signal at junction 289 is fed through a FM demodulator 294 to allow comparator 293 to monitor the phase error at this point.

The final time-base error corrections are performed by the cooperation of a phase comparator 296 and a variable delay 292 where the former measures the phase error of the video signal as it appears at junction 297 and the latter responds to an analog output signal proportional to such measurement. The synchronized and time-base error corrected video signal appears at output 298.

As component tolerances, temperature drifts and other effects will cause errors in the amount of delay realized by delays 286, 287, 291 and 290, it is preferable to adjust these networks such that a somewhat greater delay is provided than the measured phase error would dictate. This permits the variable delay devices upstream to effect suitable corrections for removing errors in the delay path caused by these variables. In applications where the required delay times are very long, the inherent delay disbursion characteristics of large ultrasonic lines can cause distortion of the signal. In this event, it is advantageous to divide the switched delay network into two cascaded portions, each providing one-half the total required delay for that network, and to invert the signal spectrum at midpoint to thus cancel the signal distortion.

For certain applications, the system illustrated by FIG. 11 can be modified by eliminating the "one" field switched delay 286 and switching delay 287 in accordance with field rate phase error information. The picture would by synchronized with respect to the field timing information instead of frame information and the resulting one-line vertical displacement of the picture, when odd fields become synchronized with even ones, may be acceptable depending on the application.

What is claimed is:

1. A variable delay system for adjusting the phase relationship between two signals, comprising, time measurement means measuring the phase relationship between said signals, a plurality of delay means of different characteristic delay times adapted to be connected in different serial combinations for selectively delaying one of the signals over a range of composite delay intervals, and switching means interconnecting said delay means and being connected and responsive to said time measurement means to change said combination at predetermined switching times and in accordance with the magnitude of the measured phase relationship, said switching means being operative to apply the signal to be delayed to each succeeding combination at a time occurring prior to said switching time by an amount at least equal to the smallest step change in delay available from the various serial combinations, whereby each new serial combination of delay means is loaded with the signal to be delayed such that at the instant of said switching time the output of the new combination provides the signal delayed in accordance with such new combination.

2. The system as defined in claim 1, further defined by said delay means being selected to have binary ordered characteristic delay times and being arranged for serial connection in descending cascaded order from longest to shortest delay times.

3. The system as defined in claim 2, said switching means comprising a separate pair of switching devices associated with each delay means except for the delay means having the shortest characteristic delay time which has one switching device associated therewith, one of each of said pairs of devices being operative to selectively by-pass the associated delay means and each of the remaining devices being operative to selectively insert the delay means associated therewith into said serial combination.

4. The system as defined in claim 3, further defined by the by-pass switching devices of each said pair of devices having a first terminal connected to the output of the associated delay means, a second terminal, and a common terminal for controlled connection to either said first or second terminals, each of said second terminals being connected to the common terminal of a preceding by-pass switching device except for said device associated with the longest delay time which has its second terminal connected to the input of such delay means; the insertion switching devices of each said pair of switching devices having a first terminal connected to the output of the associated delay means, a second terminal, and a common terminal for controlled connection of either said first or second terminal, said second terminal of each such device being connected to the common terminal of a preceding switching device except for the device associated with the longest delay means which has its second terminal connected to the input of such delay means, and said common terminals each being connected to the input of a succeeding delay means; and said switching device associated with the shortest time delay means having a first terminal connected to the output of such delay means, a second terminal connected to the common terminal of the by-pass switching device associated with the preceding delay means; and a common terminal for control connection to said first or second terminals providing the output of the combined serial delay means.

5. The system as defined in claim 4, said time measurement means issuing a plurality of separate delay control signals representing said measured phase relationship, said switching devices connected to said time measurement means and each pair of devices and the device associated with said shortest delay means being responsive to a separate one of said delay control signals, each pair of switching devices having corresponding states in which said common terminals are connected to said first terminals or connected to said second terminals of the respective switching devices.

6. The system as defined in claim 5, further comprising switch phase timing means connected between said time measurement means and said switching means and being operative to actuate said insertion switching devices in response to the delay control signals at a time prior to the response of said by-pass switching devices to the same delay control signals by an amount greater than the characteristic time of the shortest binary delay means.

7. The system as defined in claim 5, said time measurement means comprising a digital circuit having an output issuing a binary coded delay control signal representing the measured phase relationship, said binary coded signal having a plurality of ordered bits of descending significance, said digital circuit including register means for storing said binary coded signal, said switching devices connected to said register means and each said pair of said devices being disposed in one of said corresponding switching states in response to a separate one of said binary coded signal bits, the most significant such bits operating the pairs of switching devices associated with the longest binary delay means and the lesser significant bits operating the pairs of devices associated with the shorter binary delay means in a binary coded arrangement.

8. The system as defined in claim 2, further comprising an incrementally tapped delay line means connected to the output of the serially cascaded binary ordered delay means, and additional switching means connected to said time measurement means operating said incremental tapped delay line means in accordance with the measured phase relation between the signals.

9. The system as defined in claim 8, further comprising analog phase comparator means having one input connected to receive the output of said tapped delay line means and another input adapted for receiving the non-delayed signal for developing an analog signal representing the phase difference between the delayed signal and the non-delayed signal, and a continuously variable delay means having an input connected to the output of said tapped delay line means and being connected to and responsive to said analog phase comparator means.

10. The system as defined in claim 8, said time measurement means comprising a digital circuit having an output developing a binary coded signal representing the measured phase relationship between said signals, said binary coded signal having a plurality of ordered bits of descending significance, said digital circuit including register means connected to said switching means interconnecting said binary ordered delay means and to said additional switching means interconnecting said tapped delay line means, the most significant bits of said binary coded signal operating said switching means to insert or by-pass the binary delay means with respect to said serial combination thereof and the least significant bits operating said additional switching means for controlling the delay provided by said tapped delay line means.

11. A circuit for measuring the time difference between two signals to be synchronized comprising, clock pulse generator means issuing a continuous sequence of clock pulses, pulse counter means for connection to said generator means to register a count in response to said clock pulses, gating means responsive to each said signal enabling said counter means to successively start counting on a clock pulse associated with the first to occur signal and to stop counting on a clock pulse associated with the second to occur signal, analog error signal generator means issuing analog error signals having amplitudes proportional to the time between said signals and the respective clock pulses associated therewith, and analog to digital correction means connected between said analog error signal generator means and counter means responsive to said analog error signals adding or subtracting a one clock pulse count correction on said counter means in accordance with predetermined relative magnitudes of said error signals.

12. The circuit as defined by claim 11, said pulse counter means comprising a time word generator in the form of a recycling binary counter continuously responsive to said clock pulses and developing a recycling binary time word, register means responsive to said gating means separately storing the binary time words occurring at clock pulse times associated with the first and second occurring signals, binary subtractor means connected and responsive to said register means subtracting the time words carried thereby, and unit adder means serially interposed between said register means and said subtractor means and being responsive to said analog to digital correction means for selectively adding a binary bit to one of said time words.

13. The circuit as defined in claim 11, said analog to digital correction means comprising analog subtraction means subtracting the magnitude of one of said analog error signals from the other, and threshold detecting means being responsive to a preselected magnitude and polarity of a difference analog signal provided by said analog subtraction means effecting said pulse count correction.

14. A variable delay system for adjusting the phase relationship between a reference signal and an information signal having corresponding periodic synchronizing waveforms, comprising; time measurement means adapted to receive said signals and develop a time measurement signal representing a phase difference between the synchronizing waveforms of said reference and information signals, said time measurement means developing time measurement signals in a range between a minimum level and a maximum level with said range substantially equal to the period of said reference signal synchronizing waveforms, said time measurement means responsive to phase relationship changes of the synchronizing waveforms of said reference and information signals in a direction between two phase relationship conditions of maximum out of coincidence and in coincidence to cause said time measurement signal to undergo a transition between the minimum and maximum levels with the transition direction being opposite for changes in the opposite directions between said two phase relationship conditions, variable delay means comprised of a plurality of fixed delay components adapted to be connected in different serial combinations and being selected to have binary ordered characteristic delay times, and switching means selectively interconnecting said delay components in predetermined serial combination in response to said time measurement means for selectively delaying said information signal by an amount proportional to said time measurement signal, said variable delay means having a delay range capacity selected to be at least substantially equal to the period of said synchronizing waveforms and being switchably connected to be loaded with said information signal during minimum delay periods; and a fixed delay having a characteristic delay time substantially equal to one period of said reference synchronizing waveforms and being connected to delay said information signal prior to its passage into said binary ordered delay components, said time measurement means being adapted to receive said information signal prior to its entry into said fixed delay.

15. A variable delay system for adjusting the phase relationship between a reference signal and an information signal having corresponding periodic synchronizing waveforms, comprising;

time measurement means adapted to receive said signals and develope a time measurement signal representing a phase difference between the synchronizing waveforms of said reference and information signals, said time measurement means being a digital circuit having a clock pulse counter means, said time measurement means developing time measurement signals in a range between a minimum level and a maximum level with said range substantially equal to the period of said reference signal synchronizing waveforms, said time measurement means responsive to phase relationship changes of the synchronizing waveforms of said reference and information signals in a direction between two phase relationship conditions of maximum out of coincidence and in coincidence to cause said time measurement signal to undergo a transition between the minimum and maximum levels with the transition direction being opposite for changes in the opposite directions bewteen said two phase relationship conditions;

a clock pulse generator means;

gating means responsive to the relative times of occurrence of the reference and information signal synchronizing waveforms to register a proportional number of clock pulses issued by said generator means to said counter means, said clock generator means having a given clocking interval; and a variable delay means comprising a plurality of selectively cascaded binary ordered delay lines having a delay range capacity selected to be at least substantially equal to the period of said reference signal synchronizing waveforms and each delay line having a characteristic delay equal to a multiple number of said clocking intervals, and said delay means being switchably connected to be loaded with said information signal during minimum delay periods, and said delay means being responsive to said time measurement means to provide a delay period equal to said time measurement signal.

16. The system as defined by claim 15, said digital circuit counter means comprising a time word generator in the form of a recycling binary counter responsive to the clock pulses issued by said generator means and developing a recycling binary time word, register means responsive to said gating means separately storing the binary time words occurring at the respective synchronizing waveforms of said signals, binary subtractor means connected and responsive to said register means subtracting the time words carried thereby to provide a binary difference word serving as said time measurement signal, said binary difference word having a predetermined code relationship with connection of the individual binary ordered delay lines in said variable delay means.

17. The system as defined in claim 16, said gating means comprising pulse time quantizer and analog error generator means responsive to the synchronizing waveforms of said signals conditioning said register means to store the respective time words at clock times following the synchronizing waveforms relative to which the time measurement is to be made, said generator means developing separate analog error signals having magnitudes respectively proportional to the time between the occurrence of the synchronizing waveforms and the clock times associated therewith, and analog to digital correction means responsive to a predetermined threshold magnitude and polarity of the difference between said analog error signals to effect a digital change of the difference time word developed by said binary subtractor means.

18. The system as defined by claim 17, wherein the binary difference word issued by said subtractor means has a plurality of ordered bits of descending significance, and said time measurement means further comprising register means connected to store the binary word signals developed by said subtractor means and having outputs connected to and for operating said switching means, each bit carried by said register means having a coded weight representing a binary ordered time interval of the time measurement signal and each such bit functioning in accordance with its instantaneous logic state to insert or remove from the serial combination a delay component having a corresponding binary ordered delay time.

19. The system as defined by claim 18, said time measurement means being further defined by the binary word of said time measurement signal having its least significant bit corresponding to a time interval less than the time duration of a preselected portion of said synchronizing waveform.

* * * * *